United States Patent [19]

Ryan

[11] 4,001,628
[45] Jan. 4, 1977

[54] LOW-PRESSURE FLUORESCENT DISCHARGE DEVICE WHICH UTILIZES BOTH INORGANIC AND ORGANIC PHOSPHORS

[75] Inventor: Frederick M. Ryan, Loyalhanna Township, Pa.

[73] Assignee: Westinghouse Electric Corporation, Pittsburgh, Pa.

[22] Filed: Feb. 25, 1976

[21] Appl. No.: 661,075

[52] U.S. Cl. .............................. 313/487; 313/493; 313/111; 313/113

[51] Int. Cl.² .................... H01J 61/35; H01J 61/48

[58] Field of Search .......... 313/487, 493, 111, 116, 313/113

[56] References Cited
UNITED STATES PATENTS

| | | | |
|---|---|---|---|
| 2,177,701 | 10/1939 | Fonda | 428/403 |
| 2,357,732 | 9/1944 | Ehrlich | 313/487 |
| 2,424,454 | 7/1947 | Gordon | 313/487 X |
| 3,602,758 | 8/1971 | Thornton et al. | 313/487 |
| 3,622,581 | 11/1971 | Jaffe | 313/487 X |

*Primary Examiner*—Palmer C. Demeo
*Attorney, Agent, or Firm*—W. D. Palmer

[57] ABSTRACT

A fluorescent lamp fixture, or the lamp for use in such a fixture, has organic phosphor positioned to intercept a predetermined proportion of the radiations passing through the lamp envelope and to convert the intercepted radiations to longer wavelength radiations. The radiations passing the envelope which are not converted plus those radiations which are converted when blended together produce light suitable for illumination.

14 Claims, 5 Drawing Figures

LOW-PRESSURE FLUORESCENT DISCHARGE DEVICE WHICH UTILIZES BOTH INORGANIC AND ORGANIC PHOSPHORS

CROSS-REFERENCE TO RELATED APPLICATION

In copending application Ser. No. 619,544 filed Oct. 3, 1975, and owned by the present assignee, there is disclosed a fluorescent discharge lamp which efficiently illuminates objects with excellent color rendition. The radiations produced by this lamp are substantially confined to the wavelength ranges of 430 to 485 nm, 515 to 570 nm, and 588 to 630 nm. While the performance of such lamps is excellent, their commercial utility has been limited by the lack of an orange-to-red emitting phosphor which can be economically compounded. The teachings of the present application are particularly applicable to lamps of the type disclosed in this referenced copending application.

BACKGROUND OF THE INVENTION

This invention relates to fluorescent fixtures and lamps for such fixtures and, more particularly, to a fluorescent lamp fixture and the lamp which incorporate organic phosphor positioned to intercept some of the generated visible radiations to produce a blend of light suitable for illumination.

The state of the art of so-called daylight fluorescent pigments is well developed and such pigments are comprehensively discussed in "Pigment Handbook", Vol. 1, Wiley and Sons (1973), pgs. 891 through 903, Chapter by R. W. Voedisch, titled "Luminescent Pigments, Organic". The compositions of such pigments as well as their performance and some of the applications therefor are discussed in this chapter.

The use of stripes or small segregations of blue glass to color correct incandescent light to produce white light is disclosed in U.S. Pat. No. 1,966,059, dated July 10, 1934. This blue glass essentially functions as a filter.

In U.S. Pat. No. 2,924,732, dated Feb. 9, 1960, there is disclosed an electroluminescent device which incorporates an overlay of organic fluorescent pigment, with the primary purpose being to create a red emitting device, although other colors of emission are disclosed. In FIG. 5 of this patent there is disclosed an electroluminescent device which incorporates separate strips of different colors of organic pigments to provide different designs or combinations of colors.

In U.S. Pat. No. 3,248,588, dated Apr. 26, 1966, there is disclosed an electroluminescent device which incorporates a red-emitting organic fluorescent pigment in the same layer as the inorganic electroluminescent phosphor, which device will uniformly provide either red or white light of the desired hue.

SUMMARY OF THE INVENTION

There is provided a fluorescent fixture or the fluorescent lamps for such a fixture wherein the lamp comprises a low-pressure fluorescent lamp having an elongated glass envelope which encloses a discharge-sustaining filling. Electrodes are operatively positioned within the envelope proximate its ends and are adapted to sustain therebetween an operating discharge which generates ultraviolet radiations to which the envelope is substantially opaque. Inorganic phosphor is carried on the interior envelope surface and is operable to convert ultraviolet radiations generated by the discharge into visible radiations of predetermined wavelength. To this point, the lamp is generally conventional. In accordance with the present invention, organic phosphor means is carried on the outer envelope surface and is operable to convert at least some of the wavelengths of the radiations passing through the envelope into longer wavelength visible radiations. It is important that the organic phosphor occupies only a predetermined proportion of the outer surface of the envelope in order to intercept only a predetermined proportion of the total radiations passing through the envelope. It is also important that the organic phosphor has sufficient thickness to provide a predetermined operational life for effective radiation conversion. The blend of the radiations passing through the envelope and not converted to longer wavelength radiations by the organic phosphor plus those radiations passing through the envelope and not converted to longer wavelength radiations provides light suitable for purposes of illumination. In the case of a fixture, the organic phosphor can be carried anywhere inside the fixture and exteriorly of the lamp. As the lamp is operated, the operating portion of the organic phosphor gradually bleaches to a substantially non-fluorescing and non-visible-radiation-absorbing state. The thickness of the organic phosphor is predetermined in order to provide the effective fluorescent life which is desired for the organic phosphor.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
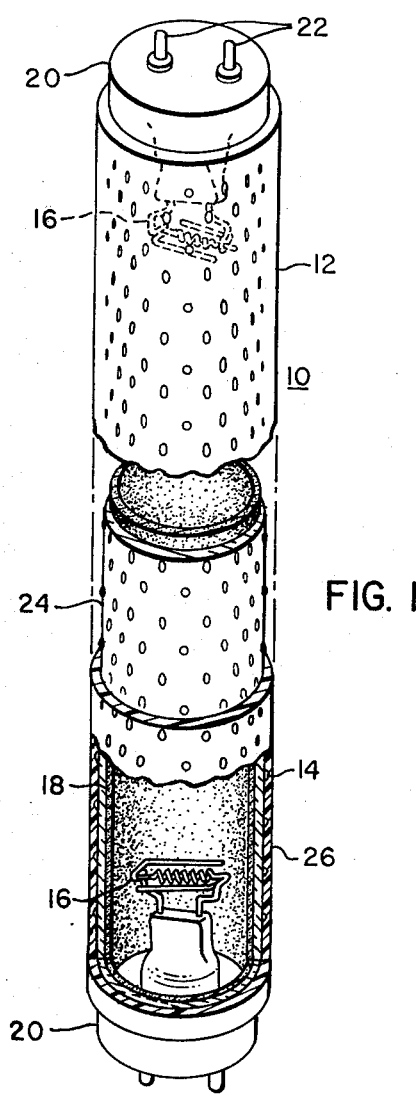
FIG. 1 is an isometric view of a fluorescent lamp, shown partly in section, which incorporates inorganic phosphor and organic fluorescent pigment in accordance with the present invention.

With specific reference to the form of the invention illustrated in the drawings, the lamp 10 is of the low-pressure, positive-column fluorescent type comprising an elongated visible-radiation-transmitting glass envelope 12 which encloses a discharge-sustaining filling comprising a small charge of mercury 14 and a small charge of inert starting gas, such as four torrs of argon. Electrodes 16 are operatively positioned within the envelope proximate the ends thereof and adapted to sustain therebetween an operating discharge which generates ultraviolet radiations to which the envelope 12 is substantially opaque. Inorganic phosphor means 18 is carried on the interior surface of the envelope 12 and is operable to convert ultraviolet radiations generated by the operating discharge into visible radiations of predetermined wavelength. The construction of the lamp as described hereinbefore is generally conventional and base caps 20 are affixed to the envelope ends and support base pins 22 to facilitate electrical connection to a power source.

In accordance with the present invention, organic phosphor means 24 is carried on the outer surface of the envelope 12. This organic phosphor means is operable to convert at least some of the wavelengths of the radiations passing through the envelope into longer wavelength visible radiations. These organic phosphors are generally known in the art and are described in detail in the foregoing referenced chapter from "Pigment Handbook". Such organic phosphors do have several limitations as compared to the conventional inorganic phosphors which are used with fluorescent lamps. For example, the organic phosphors are not stable enough chemically to be placed inside of a discharge lamp envelope since they break down under the intense ultraviolet which is present. In addition, the organic phosphors tend to bleach upon prolonged exposure to light and, in addition, they are subject to cross-excitation. In explanation, cross-excitation means that the fluorescence from one organic phosphor can be absorbed by another organic phosphor which has a longer fluorescence wavelength. As a result, the fluorescence from mixtures of organic phosphors does not therefore follow a simple additive relationship, but consists primarily of the fluorescence of the longest emitted wavelength present in the mixture.

In accordance with the present invention, the organic phosphor material or means 24 is positioned to occupy only a predetermined proportion of the outer surface of the envelope in order to intercept only a predetermined proportion of the total radiations passing through the envelope. In this manner, the radiations intercepted by the organic phosphor will be converted to longer wavelength radiations and those radiations which are not intercepted by the organic phosphor will be passed through the envelope in an unaltered fashion and thereafter blended with the longer wavelength radiations generated by the organic phosphor to produce light suitable for purposes of illumination. To overcome the problem of bleaching, the small segregations of organic phosphor 24, which have the appearance of dot-like segregations, are applied in a relatively thick fashion. It has been observed that these organic phosphors bleach to a substantially non-fluorescing and non-visible-radiation-absorbing state over a period of time as they are fluoresced, and by providing these dot-like segregations with sufficient thickness, the organic phosphors will display a predetermined effective life as desired for their operation. Thus, by providing the organic phosphors in the segregated elements which are relatively thick, the disadvantages of organic fluorescent phosphors are eliminated.

It should be clear that if the organic phosphor was applied uniformly as a relatively thick layer over the entire surface of the envelope, it would intercept all of the radiations generated within the envelope and in the case of a red-emitting organic phosphor, substantially all radiations generated within the envelope would be converted to red. If such a continuous organic phosphor layer were made sufficiently thin so as not to convert at least a large proportion of the radiations, then the bleaching of the relatively thin layer of organic phosphor would limit the effective life of such phosphor. Considering the bleaching effect in greater detail, typically, a fluorescent dye molecule will absorb on the average about $10^5$ to $10^6$ photons and fluoresce $10^5$ to $10^6$ times during its lifetime. With the absorbed photon flux and dye molecule concentration suitable for application in fluorescent lamps, this will normally result in a serious reduction in the output of the organic phosphor due to bleaching after only about 100 hours of operation. Since these lamps are normally operated with a rated life expectancy of 16,000 hours or so, the bleaching in the case of a thin layer would severely limit the usefulness of the lamp.

This problem is readily overcome by applying the dot-like segregations in a considerable thickness, such as from 1 to 10 mils (25.4 microns to 254 microns), for example. In this manner, as the phosphor bleaches to a transparent and non-fluorescing state, the active organic phosphor which overlies the bleached portion will serve to convert the radiations which pass through the envelope and are intercepted by the organic phosphor means.

As a specific example, the inorganic phosphor means which is carried as a layer 18 on the interior envelope surface is a mixture of divalent europium-activated strontium chloroapatite and manganese-activated zinc silicate. Both of these phosphors are known in the art and the chloroapatite is a blue emitter when excited by the ultraviolet radiations generated by the discharge. The silicate is a green emitter when excited by the radiations generated by the discharge and the two phosphors are mixed in total amount of 7 grams in the case of a 40WT12 size envelope with the relative weight proportions being 15 percent chloroapatite and 85 percent silicate.

The dot-like segregations can be formed of any suitable organic phosphor means which has the desired fluorescence, and as an example, the organic fluorescent material is rhodamine B dissolved in toluene-sulfonamide resin applied in a pattern to occupy about 35% of the area of the outer surface of the envelope 12, with each of the dot-like segregations having a diameter of about 1 mm and a thickness of about 75 microns. With such a lamp, the blueemitting chloroapatite inorganic phosphor will have its emission principally confined to the wavelength ranges of from 430 nm to 485 nm and the green-emitting silicate will have its emission principally confined to the wavelength range of from 515 nm to 570 nm. The organic rhodamine B as dissolved in the indicated resin is primarily responsive to the green emissions and has its emission principally confined to the wavelength range of from 588 to 630 nm. In this manner, and in accordance with the general teachings as set forth in the aforementioned copending application Ser. No. 619,544, filed Oct. 3, 1975, objects are illuminated very efficiently with excellent color rendition for illuminated objects.

While the preferred disposition for the organic phosphor means is a series of polka-dot or small dot-like segregations, the organic phosphor could be applied as individual stripes or other suitable pattern, if desired.

Figure 2:
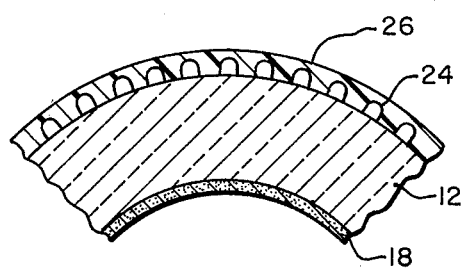
FIG. 2 is an enlarged, fragmentary, sectional view of a portion of the fluorescent lamp envelope as shown in FIG. 1.

In FIG. 2, there is shown an enlarged fragmentary sectional view of a portion of the envelope as shown in FIG. 1. As a general rule, the conventional glass envelopes for fluorescent lamps are formed of soda-lime-silicate glass which is impervious to the ultraviolet radiations generated by the discharge, but which readily transmits the visible radiations generated by the inorganic phosphor layer 18. In this embodiment, the dot-like pattern of organic phosphor 24 is overcoated with a protective layer 26 such as a layer of cellulose acetate plastic material having a thickness of approximately 10 mils (254 microns). This prevents the organic phosphor material from being rubbed off. The layer 26 need not be used.

Figure 3:
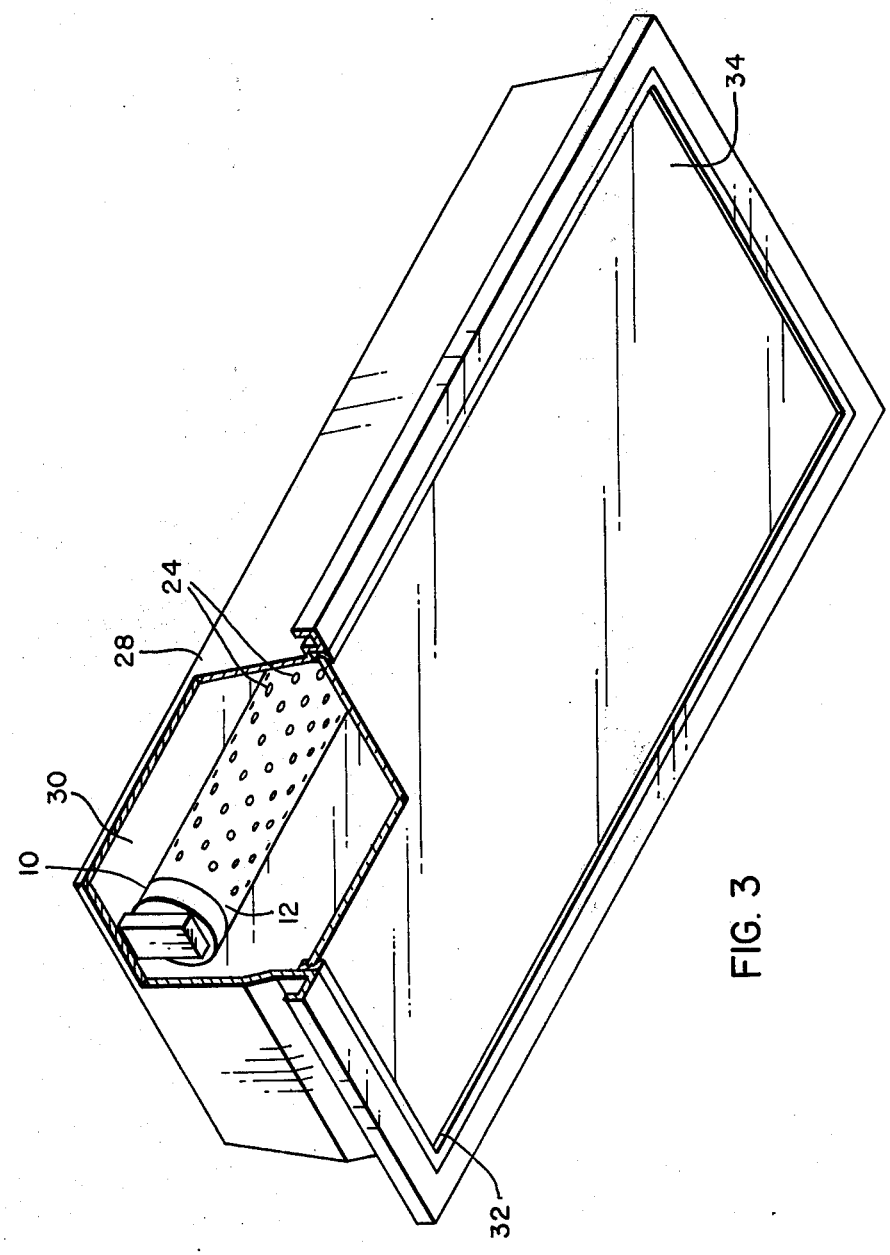
FIG. 3 is an isometric view, partly in section, of a fluorescent fixture which incorporates organic fluorescent material in accordance with the present invention.
Figure 4:
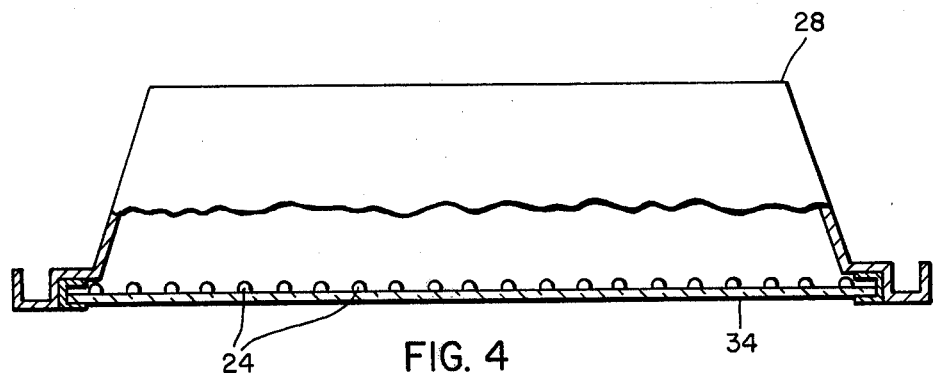
FIG. 4 is a fragmentary, sectional elevation of the fixture as shown in FIG. 3 showing the organic fluorescent material carried on the fixture shield.
Figure 5:
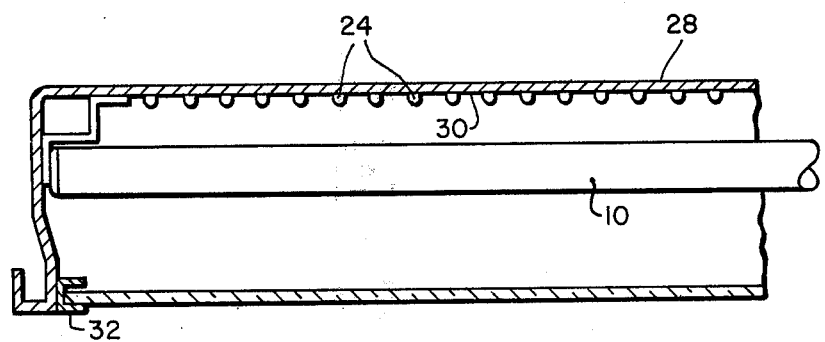
FIG. 5 is a fragmentary, sectional side elevational view of the fixture as shown in FIG. 4, but showing the organic fluorescent material carried on the interior of the fixture housing.

In FIGS. 3, 4 and 5, there is shown generally a conventional fluorescent fixture which comprises a housing body 28 having a reflecting inner surface 30 and defining a light-emitting opening 32. Contained within the opening is a light-transmitting and light-diffusing shield 34 and a fluorescent lamp means such as the lamp 10 shown in FIG. 1 is contained within and enclosed by the housing body. In accordance with the present invention, the organic phosphor means 24 is supported within the fluorescent fixture 28 and exteriorly of the lamp 10. In this manner, the organic phosphor means, which occupies only a predetermined area within the fixture or device 28, will intercept only a predetermined proportion of the total radiations which are passed through the envelope 12 of the fluorescent lamp means 10. Thus the blend of the radiations which pass through the envelope and are converted to longer wavelength radiations plus those radiations passed through the envelope 12 and not converted to longer wavelength radiations provide light, and preferably white light, which is suitable for purposes of illumination. In one possible embodiment, the organic phosphor can be supported on the outer surface of the envelope 12, such as shown in FIGS. 1 and 3. In another possible embodiment, the organic phosphor can be supported on the light-transmitting shield and such an embodiment is shown in FIG. 4. As still another construction, the organic phosphor can be supported on at least a portion of the inner reflective surface 30 of the housing 28 and such an embodiment is shown in FIG. 5. In any of these embodiments, the organic phosphor can have the appearance of small dot-like segregations or stripes or any other desired configuration.

The bare operating lamp, as viewed directly, will display a polka-dot appearance, although objects illuminated by the bare lamp will in effect be illuminated by the blend of total radiations generated by the lamp. For a lamp contained within a recessed fixture having a diffusing shield, however, the radiations passing the shield will be the blend of radiations, which preferably is white in appearance, since the fluorescent fixture provides a means for blending all radiations generated therein.

While rhodamine B is an excellent fluorescent dye, any of the other indicated materials as specified in the foregoing "Pigment Handbook" reference can be used if they have the color of fluorescence which is desired. As pointed out in this publication, fluorescent dyes normally must be in dilute solution in order to fluoresce and exceeding an optimum concentration results in a quenching of the fluorescence due to molecular collisions, reabsorption of emitted light, and other processes. It is preferred to freeze these solutions to a rigid glass-like material. This intensifies the fluorescence and also increases the resistance to fading or bleaching.

In its preferred form, the present organic phosphor is intended to provide relatively long wavelength radiations, such as orange to red radiations, to blend with readily obtained blue and green radiations, in order to provide a very efficient source of illumination which preferably has a white appearance and which will provide excellent color rendition for illuminated objects.

The term "white light", of course, is inclusive of a somewhat wide range of pure white and off-white colors, all of which fall within the general categorization of "white", as is more carefully explained in the aforementioned copending application Ser. No. 619,544, filed Oct. 3, 1975. A similar disclosure of white light is set forth in FIG. 1 of U.S. Pat. No. 3,875,453 dated Apr. 1, 1975.

As another embodiment, the present organic phosphor can be used to supplement the color of a conventional lamp, such as a cool-white halophosphate lamp, or any other commercially available lamp, for example, in order to supply red radiations to enhance the flesh tones, for example, of persons illuminated by such a lamp. Other similar applications for the organic fluorescent materials as utilized herein will be apparent.

While normally the organic phosphor materials as used herein will be those which emit in the longer visible wavelengths, such as orange to red, organic phosphors which fluoresce in other colors can also be used for special applications.

In applying the organic phosphor material to the lamp envelope or other substrate, the pigment is first formed such as by dissolving 1 percent by weight of rhodamine B in toluene-sulfonamide resin, with the resulting glass-like material ground to finely divided state. This formed pigment is then applied to the desired substrate by any of several techniques which are generally known, such as printing as an ink using a silk-screening process or spraying through a mask. In the case of the ink, water-soluble acrylics can be used as binders. For spraying through the mask, acrylic lacquers can be used as binders with the weight ratio of acrylic to pigment being 1:2, for example. Also, the pigment can be melted and applied directly from the melt.

While the fluorescent lamp as illustrated and described hereinbefore is generally similar to the present commercial types of such lamps, it should be understood that the organic phosphor means can be used to modify the emission of different types of fluorescent lamp means, including those which have plural envelopes, provided that the operating temperatures to which the organic phosphor material is exposed are not excessive. A typical "excessive" operating temperature for the usual organic phosphor means is one exceeding about 100° C, although some types of such materials will withstand higher temperatures.

I claim:

1. A low-pressure, positive-column fluorescent lamp comprising an elongated visible-radiation-transmitting glass envelope which encloses a discharge-sustaining filling comprising mercury and inert starting gas, electrodes operatively positioned within said envelope proximate the ends thereof and adapted to sustain therebetween an operating discharge which generates ultraviolet radiations to which said envelope is substantially opaque, inorganic phosphor means carried on the interior surface of said envelope and operable to convert ultraviolet radiations generated by said operating discharge into visible radiations of predetermined wavelength, organic phosphor means carried on the outer surface of said envelope, said organic phosphor means operable to convert at least some of the wavelengths of the radiations passing through said envelope into longer wavelength visible radiations, said organic phosphor means occupying only a predetermined proportion of the outer surface of said envelope to intercept only a predetermined proportion of the total radiations passing through said envelope, said organic phosphor means having a predetermined thickness to provide a predetermined operational life for effective radiation conversion, and the blend of radiations passing through said envelope and converted to longer wavelength radiations by said organic phosphor means plus those radiations passing through said envelope and not converted to longer wavelength radiations providing light suitable for purposes of illumination.

2. The light source as specified in claim 1, wherein said organic phosphor means is an organic fluorescent pigment.

3. The lamp as specified in claim 1, wherein said organic phosphor means is applied to said envelope in a predetermined pattern.

4. The lamp as specified in claim 3, wherein said predetermined pattern has the appearance of small dot-like segregations.

5. The lamp as specified in claim 1, wherein said inorganic phosphor means emits visible radiations which do not include as large a proportion of orange-to-red radiations as desired, and said organic phosphor means is selected to convert relatively short wavelength visible radiations into radiations of an organe-to-red color.

6. The lamp as specified in claim 1, wherein said blend of radiations provides white light suitable for purposes of illumination.

7. The lamp as specified in claim 6, wherein said inorganic phosphor means is a mixture of blue-emitting phosphor and green-emitting phosphor, and said organic phosphor means is selected to convert relatively short wavelength visible radiations into radiations of an orange-to-red color.

8. The lamp as specified in claim 7, wherein said inorganic phosphor means has its emission principally confined to the wavelength ranges of from 430 nm to 485 nm and from 515 nm to 570 nm, and said organic phosphor means has its emission principally confined to the wavelength range of from 588 nm to 630 nm.

9. The lamp as specified in claim 8, wherein said blue-emitting phosphor is strontium chloroapatite activated by divalent europium, said green-emitting phosphor is manganese-activated zinc silicate, and said organic phosphor means is rhodamine B dissolved in toluene-sulfonamide resin applied in a pattern to occupy about 35 percent of the outer surface of said envelope, with said applied organic phosphor means having a thickness of at least about 75 microns.

10. The fluorescent lamp as specified in claim 1, wherein said organic phosphor means bleaches to a substantially non-fluorescing, non-visible radiation-absorbing state over a period of time as it is fluoresced, and the thickness of said organic phosphor means is predetermined to provide the effective fluorescent life which is desired for said organic phosphor means.

11. The fluorescent lamp as specified in claim 1, wherein said organic phosphor means is covered over and protected by a thin light-transmitting plastic layer.

12. In combination with an illuminating device comprising a housing body having a reflecting inner surface and defining a light-emitting opening, a light-transmitting light-diffusing shield means closing said opening in said housing body, and fluorescent lamp means contained within and enclosed by said housing body, said fluorescent lamp means comprising elongated visible-radiation-transmitting glass envelope means which encloses a discharge sustaining filling comprising mercury and inert starting gas, electrodes operatively positioned within said envelope means proximate the ends thereof and adapted to sustain therebetween an operating discharge which generates ultraviolet radiations to which said envelope means is opaque, and inorganic phosphor means carried on the interior surface of said envelope means and operable to convert ultraviolet radiations generated by said operating discharge into visible radiations of predetermined wavelength, the improvement which comprises:

organic phosphor means supported on the outer surface of said envelope means of said fluorescent lamp means, said organic phosphor means operable to convert at least some of the wavelengths of the radiations passing through said envelope means into longer wavelength visible radiations, said organic phosphor means occupying only a predetermined proportion of the surface of said envelope means to intercept only a predetermined proportion of the total radiations passing through said envelope means, said organic phosphor means having a predetermined thickness to provide a predetermined operational life for effective radiation conversion, and the blend of radiations passing through said envelope means and converted to longer wavelength radiations by said organic phosphor means plus those radiations passing through said envelope means and not converted to longer wavelength radiations providing light suitable for purposes of illumination, and means for blending together all radiations generated within said illuminating device and passed through said shield means.

13. The combination as specified in claim 12, wherein said organic phosphor means is disposed in a predetermined pattern which has the appearance of small dot-like segregations.

14. The combination as specified in claim 12, wherein the blend of total visible radiations generated within said illuminating device provides white light suitable for purposes of illumination.

* * * * *